United States Patent [19]
Rostron

[11] Patent Number: 5,900,723
[45] Date of Patent: May 4, 1999

[54] VOLTAGE BASED VAR COMPENSATION SYSTEM

[75] Inventor: Joseph R. Rostron, Brandon, Miss.

[73] Assignee: Siemens Power Transmission & Distribution, L.L.C., Wendell, N.C.

[21] Appl. No.: 08/919,465

[22] Filed: Aug. 28, 1997

Related U.S. Application Data

[63] Continuation of application No. 08/565,604, Nov. 30, 1995, abandoned.

[51] Int. Cl.[6] .................................................. G05F 1/70
[52] U.S. Cl. ................................. 323/210; 323/255
[58] Field of Search .................................. 323/208, 209, 323/210, 215, 216, 255, 256, 301, 340, 341

[56] References Cited

U.S. PATENT DOCUMENTS

| | | | |
|---|---|---|---|
| 4,249,237 | 2/1981 | Ronk et al. | 363/150 |
| 4,384,247 | 5/1983 | Stewart | 323/256 |
| 4,425,541 | 1/1984 | Burkum et al. | 324/51 |
| 4,636,708 | 1/1987 | Whyte | 323/210 |
| 5,541,498 | 7/1996 | Beckwith | 323/211 |
| 5,598,079 | 1/1997 | Robert | 318/780 |
| 5,670,864 | 9/1997 | Marx et al. | 323/211 |

*Primary Examiner*—Shawn Riley
*Assistant Examiner*—Derek J. Jardieu

[57] ABSTRACT

A VAR generator compensation system wherein the voltage of the capacitor or reactor bank is changed as a means of adjusting the phase angle is taught. Briefly stated a reactive bank such as a capacitor bank is connected to the secondary of an autotransformer such that the voltage of the reactive bank is controlled by the autotransformer. The line and load are connected to the primary of the autotransformer, such that changing the voltage of the autotransformer and hence the secondary voltage connected to the reactive bank, thus changes the VARS generated on the grid or system.

19 Claims, 2 Drawing Sheets

VOLTAGE BASED VAR COMPENSATION SYSTEM

CROSS-REFERENCE TO RELATED APPLICATIONS

This is a continuation of Ser. No. 08/565,604 filed on Nov. 30, 1995 now abandoned.

FIELD OF THE INVENTION

This invention relates, generally, to VAR Generators and more particularly to a VAR generator compensation system wherein the voltage of the capacitor or reactor bank is changed as a means of adjusting the phase angle in a distributed load system.

BACKGROUND OF THE INVENTION

There is an increasing need, both on the part of the electric utility industry and of end-users, to improve and maintain power quality. The reasons for this are many, but generally include the direct cost of billable power delivered to a user. Hence, where current and voltage are in phase with each other (unity power, i.e. having a power factor of 1, pf 1) the maximum amount of power is delivered and hence, can be billed. Further, and perhaps to some extent more importantly, the secondary costs of power are becoming more dominant. By secondary costs, are meant equipment maintenance problems resulting in reduced life or efficiencies when unity power is not achieved. One example of this is overheating and/or inefficient operation of motors as current lags voltage.

Moreover, this problem is even more pronounced of late as a result of recent regulatory changes which allow electric power users to purchase power from distant producers of electricity, rather than the local utility company. As such, due to the potential for a great number of users connecting to, placing power on, or removing power from the electric grid, the quality of power is not only apt to have greater swings to it, it is likely to happen much more frequently.

Solutions for correcting power factor in order to bring the phase angle closer to unity typically incorporate what are commonly referred to as VAR generator systems. These have taken many forms, the most prevalent being capacitor banks, but all attempt to adjust the timing and hence phase of the voltage in relation to the current in order to bring it in line with current. Power, in an alternating current system, is based upon the value of the voltage multiplied by the value of the current and of the cosine of the phase angle between them ($P=VI\cos\theta$). Accordingly, where current and voltage are in phase unity is achieved and the phase angle is zero and hence the cosine of zero degrees is one and, therefore, power approaches its maximum amount (the voltage times the current ($P=VI$)).

It is well known that loads on the system, as well as transmission lines themselves, are generally inductive (and sometimes reactive) in nature. Therefore, the current will lag the voltage by some amount theta ($\theta$). Therefore, as a practical matter, the power factor is less than one. Since consumers of electricity are metered upon current consumed, rather than the mathematical product of the two multiplied by the phase angle, consumers are, in effect, charged at a rate equal to a unity of one, but in fact receive less power. While utility companies attempt to provide power at unity, it is extremely expensive and difficult to do, despite the fact that this also indirectly affects the utilities ability to effectively meter and control their grid, thereby depriving them of potential revenue or to adjust the size of the grid to compensate for losses. Moreover, equipment, particularly industrial equipment, will consume more current and hence more power when the power factor is less than 1. This in turn requires the utility to produce, distribute and control more power which is costly. Hence, there is an incentive for utilities and consumers to produce and obtain optimum power, i.e. voltage and current having a power factor of 1.

As mentioned, the typical solution is to add capacitor banks either at substations or to the distribution lines in the grid. Further, some large users attempt to also add capacitor banks at the individual point of consumption. While this will of course improve the voltage at the end location, switching of capacitor banks in response to varying changes in the system, generates voltage transients that are frequently more objectionable than the low voltage/low power at the end location. These voltage transients cause problems themselves and the advent of computers, processors and the like, has made these disturbances more objectionable. Further, losses of computer systems and sub-systems cause even more problems when they are adversely affected.

As previously indicated, a number of methods have been tried to overcome these problems. One such solution may be found in U.S. Pat. No. 3,573,549 entitled "Electrical System Including Capacitors", issued Apr. 1, 1971 to Wolf. There, it is taught that capacitance in a load circuit is decreased in response to the changes in the applied voltage wherein capacitors are connected parallel to each other which are then connected in series with the load, and wherein a second bank of capacitors is connected in parallel with the first bank such that the addition or deletion of the second bank boosts voltage and, hence, the KVARs supplied to the circuit are adjusted.

A schematic diagram of this may be seen in FIG. 1, in which, typically, there is a capacitor bank VAR system showing generally as (10). This VAR system (10) is comprised of a power source which may be an electrical generation facility, a sub-station or the like (12). The system impedance is shown schematically in box (14) and represents the impedance of the system as a function of transmission equipment, lines, length of lines and the like. Similarly, the load (16) is shown. Connected serially between the power source (12) and the load (16) are capacitor banks A and B (18), (20) respectively. Capacitor bank A is comprised of capacitors (22), (24) and (26), while similarly, capacitor bank B is comprised of capacitors (23), (25) and (27). As can be seen, steady state current flows through capacitor bank A (18) and by closure of bank switch (28) capacitor bank B (20) is placed in parallel with capacitor bank A (18).

Accordingly, the customary intent and solution of VAR systems is to place a varying number of electrically parallel capacitors in series as a bank in order to achieve a unity power factor or as close thereto as possible. In this fashion, it can be seen that phase control is obtained by switching the entire bank on or off, or multiples of banks on or off in one operation in an attempt to retard the voltage with respect to the current. In practice, it is readily known that finer resolution is obtained by making multiple banks of smaller sizes. However, this is obviously more expensive since each bank must be separately switched while also requiring additional space. Similarly, with increased numbers of capacitors for finer control the likelihood and frequency of voltage transients and, hence, damage to down-line equipment is greatly increased.

Other examples of automated VAR-type systems may be found in U.S. Pat. No. 5,422,561 entitled "Automated Voltage And VAR Control In Power Transmission And Distribution Networks", issued Jun. 6, 1995 to Williams, et al. There, an elaborate algorithm-based scheme is utilized to again simply switch capacitors in and out of the network. Another VAR-type of system may be found in U.S. Pat. No. 4,769,587 entitled "Power Factor Control With Overvoltage And Undervoltage Override Control In A Capacitor Control System For A Distribution System", issued Sep. 6, 1988 to Pettigrew. This patent again teaches the use of switching in or out a plurality of capacitors in the capacitor bank with method and apparatus to modify the operating characteristics of the system depending on load conditions, i.e., light versus heavy loads.

U.S. Pat. No. 4,719,402 entitled "VAR Generator System With Minimal Stand-by Losses", issued Jan. 12, 1988 to Brennen, et al, utilizes capacitor banks wherein thyristor switches are utilized to add or delete the reactive components such as the capacitor bank or an inductor.

U.S. Pat. No. 4,684,875 entitled "Power Conditioning System And Apparatus", issued Aug. 4, 1987 to Powell, utilizes a synthesizer network to develop a "stiffness" to suddenly lagging phase angles and the like, again with capacitor banks.

U.S. Pat. No. 4,645,997 entitled "Transient Free Solid State Automatic Power Factor Correction", issued Feb. 4, 1987 to Whited, utilizes capacitors hooked up in a Delta-type configuration through use of optically isolated semiconductor devices.

U.S. Pat. No. 4,482,857 entitled "Close Loop Power Factor Control For Drilling Rigs, issued Nov. 13, 1984 to Porche, et al., utilizes an over-excited generator in order to provide reactive power to effect power factor correction.

U.S. Pat. No. 4,307,331 entitled "Hybrid Switched-Capacitor Controlled-Inductor Static VAR Generator In Control Apparatus, issued Dec. 22, 1981 to Gyugyi, utilizes a VAR detector/controller in conjunction with parallel capacitors to switch in a bank of capacitors in order to effect phase angle changes.

U.S. Pat. No. 4,275,346 entitled "Static VAR System With Means For Correcting For Negative Phase Shift", issued Jun. 23, 1981 to Kelley, Jr., discloses the use of phase control switches with a capacitor bank.

Moreover, the larger the system or the finer the control necessary or desired, the more expensive and larger in complexity the control system becomes.

SUMMARY AND OBJECT OF THE INVENTION

Accordingly, it is an object of-the present invention to produce a VAR generator which minimizes or eliminates the need to switch capacitors in or out in order to effect any phase angle correction. Another object of the present invention is to produce a VAR generator which is relatively inexpensive to implement. Another object of the present invention is to produce a VAR generator having stepped increments which allows for fine resolution.

Yet another object of the present invention is to produce a VAR generator which is substantially smaller than present-day VAR generator systems yet having at least the same power and/or resolution. Still another object of the present invention is to produce a VAR generator which will work over a large range of voltages. Yet another object of the present invention is to produce a VAR generator which utilizes existing known adjustment mechanisms such as a auto-transformers which are commonly referred to as tap changers.

Still another object of the present invention is to change the voltage of the reactive bank, capacitors or inductors or a combination of both, so that the voltage of the bank is different from the voltage of the power system. It is yet another object of the present invention to produce a VAR generator wherein incremental corrections to the phase angle create switching transients which are no greater than two times the size of the voltage step change, rather than existing equipment which may cause voltage transients of at least several times the voltage step change.

It is still another object of the present invention to produce an inexpensive yet accurate or fine VAR generator control for small systems without the cost and size penalties of larger traditional systems.

Yet another object of the present invention is to produce a device for VAR compensation in a power distribution network including power lines and a load and an reactive bank, such as a capacitor bank, comprising an autotransformer device having a primary and a secondary winding connectable to a line and a load, the secondary winding producing a plurality of voltages relative to the voltage of the primary winding at an output terminal thereat, at least one reactive bank such as a capacitor bank having a first pole connected to the output terminal and a second pole connectable to a current path associated with the load.

BRIEF DESCRIPTION OF THE DRAWINGS

Reference may now have to be accompanying drawings in which.

DETAILED DESCRIPTION OF THE PREFERRED EMBODIMENT

Figure 1:
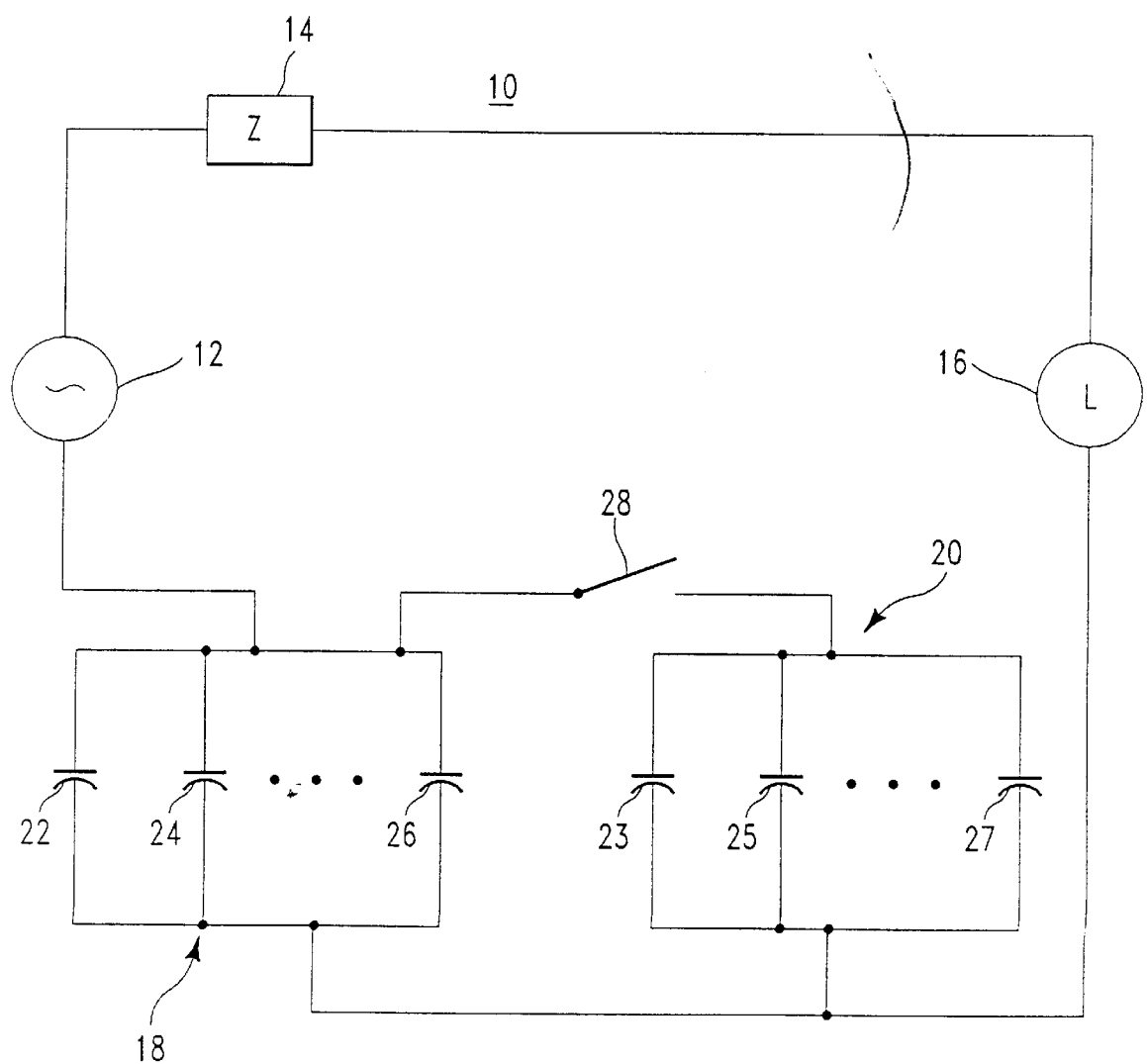
FIG. 1 is an exemplary diagram of existing or prior art VAR generators.

Referring now to FIG. 1, there is, as previously discussed, a diagram of the existing technology for VAR compensation and, hence, only a brief description of same will now be had. Here, it can be seen that generally A and B capacitor banks (18), (20) may be placed in parallel with each other, but in any event, are serially disposed within the circuit network. It can be seen that the voltage of the capacitor banks (18), (20) is the same as that of the system and thereby uses inherent characteristics of capacitors to have the voltage lag the current thereby compensating for the inductance of such traditional networks. Although not shown, it is understood that banks of inductors, or a combination of both, are traditionally utilized. In any event, however, the voltage of the bank is the voltage of the network.

Figure 2:
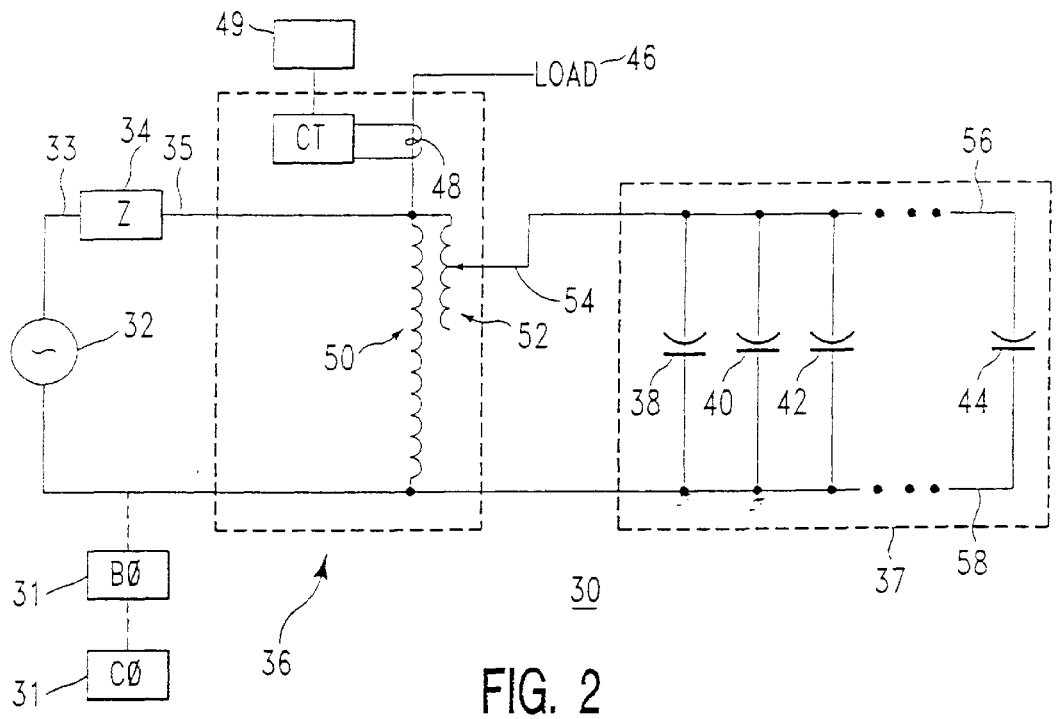
FIG. 2 is a schematic diagram of VAR generator according to the present invention.
Figure 3:
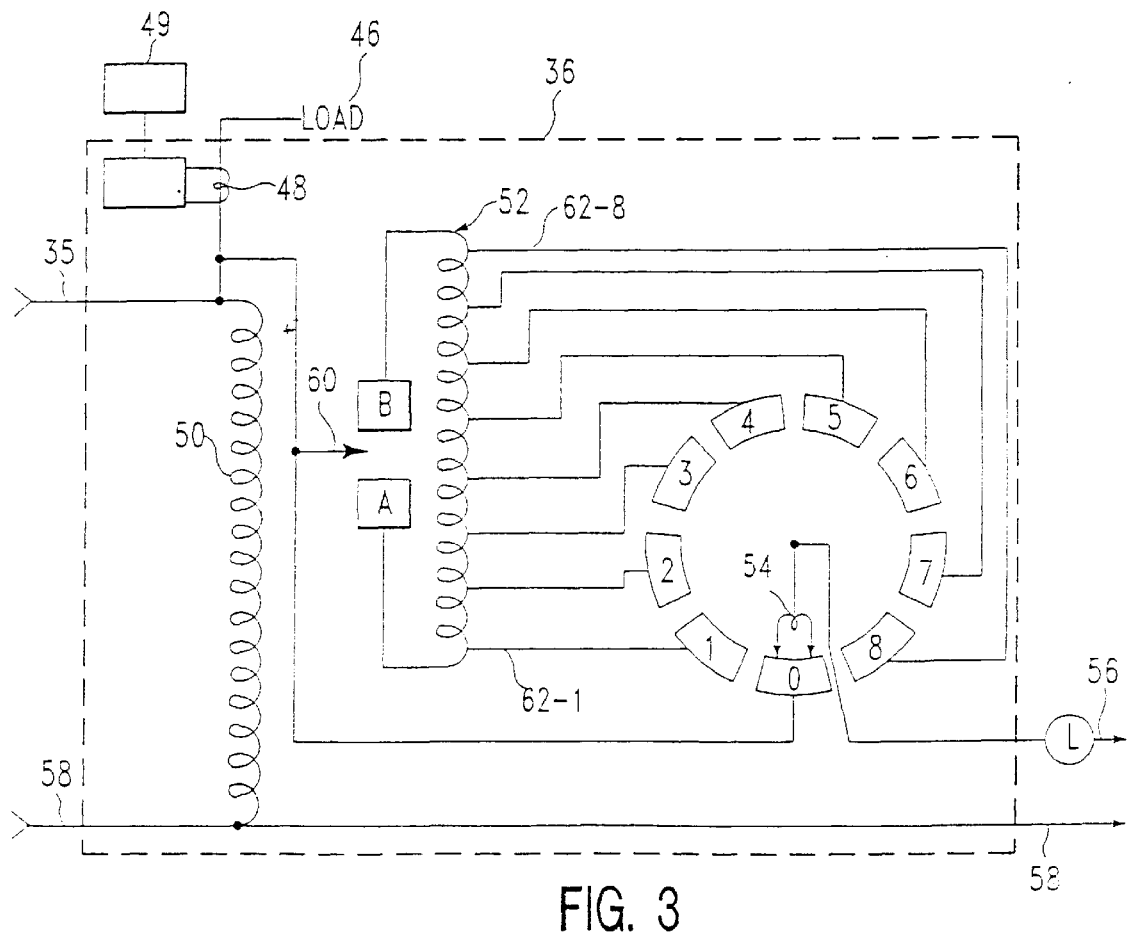
FIG. 3 is a representation of the autotransformer shown in FIG. 2 which is utilized to effect VAR control according to the present invention.

Referring now to FIG. 2, there is shown a diagrammatic representation of the variable voltage amp reactive (VAR) system 30 as it is utilized according to the present invention. More particularly, the line side of the system is represented by 32 with current flowing through power lead 33 and thence thru the system impedance which is represented by block 34. Thereafter the current flows thru system line lead A with lead 35 and the other terminal of the power source 32 being connected to autotransformer primary winding 50. The interior workings of the autotransformer, shown in dashed line 36, are shown in FIG. 3 and described more fully below. A current transformer 48 is connected to system line lead A and in series with the Load shown at 46.

Connected to current transformer 48 is, in the preferred embodiment of the present invention is an electronic control mechanism 49 which is external to the housing of the autotransformer 36. Control mechanism 49, using known technology, measures voltage magnitude, current magnitude and the phase angle between the two for the power supplied to load 46. These values can be compared directly to the calculated or measured capacitive currents that capacitor bank 37 is providing at that instant in time in the calculation/control process.

Autotransformer 36 has a secondary winding 52 and has connectable thereto an autotransformer output arm 54 which allows for varying the transformer primary to secondary voltages as is known to one skilled in the art of autotransformers. Autotransformer output arm 54 has connected thereto an autotransformer output terminal or lead 56 which is, in turn connected, in the preferred embodiment of the present invention, to a number of capacitors such as 38, 40, 42 and 44. These capacitors 38–42 are of the same type as is commonly used in VAR correction systems. It is to be understood that the number and value of these capacitors can be adjusted without departing from the spirit and scope of the present invention. The remaining terminals of capacitors 38–42 are connected to system line lead B, which in the preferred embodiment of the present invention is the Neutral lead and is of course common to one lead of the power source 32 and the primary winding 50 of autotransformer 50.

It is to be shown that for polyphase systems as are normally encountered, a plurality of autotransformers 36 and capacitor banks 37 are to be used for each phase in the system. Accordingly, in a three-phase systems phases B and C would each utilize second banks 31.

Referring now to FIG. 3 there is shown a representation of a typical autotransformer as is preferably used and shown in FIG. 2 described above. Shown is system line lead A 35 as well as system line lead B 58 (which is in effect the neutral leg). Also shown is the autotransformer primary winding 50, current transformer 48 which is electrically common to system line lead A 35 and is in turn connected to control mechanism 49.

Also shown is reversing switch 60 which cooperates with secondary winding 52. Secondary winding 52 has a plurality of stationary contact points 62.1–62.8 which are, in turn, connected to contact pads 1–8 (contact pad 0 is connected directly to reversing switch 60. Autotransformer output arm 54 has, as is commonly practiced, two arms and is rotatable so as to contact each of contact pads 1 thru 8, having two arms in order to bridge between adjacent contact pads without interruption to the flow of current. Autotransformer output arm 54 forms autotransformer output terminal lead 56, which as shown in FIG. 1, is connected to capacitor bank 37.

In practice, contact pads 1–8 engage the fingers of output arm 54, moving from contact to contact in a clockwise or counterclockwise fashion depending upon whether the voltage is to be raised or lowered. As such, to raise the voltage in a scheme such as is shown in FIG. 3, the reversing switch 60 moves to the A position. The moving fingers 54 would then move to contact pads 1,2 and continue in that direction until both are on contact pad 8, the maximum raise position. Similarly, to lower the voltage, the reversing switch 60 would be moved to the B position which would cause the fingers to move to the 8,7 position and so on until both arms 54 are on contact pad 1.

Accordingly, it can be seen that by using the autotransformer 36, the voltage across capacitor bank 37 is raised or lowered accordingly. This capacitor voltage, as can be seen, is different from the voltage being applied to the load 46. However, the capacitor bank 37 will adjust the phase angle between the current and voltage just like standard VAR control schemes. It has been found that by changing the voltage of this lumped capacitor bank 37 has the effect of changing the size of the bank and thus incrementally changes the size of the phase angle or voltage of the power system. Further, the relatively small steps in voltage changes by the autotransformer create switching transients having a magnitude which is not more than two times the size of the voltage step change. Therefore, even if the voltage step is 10%, the switching transient is only 20% which is well below the critical values of sensitive computer systems.

Control mechanism 49 is of course, operatively connected to the raise/lower mechanism 60 of autotransformer 36. As indicated, control mechanism 49 uses current transformer 48 to sense the voltage and current magnitudes and phase angle between them by standard and readily known techniques. This would therefore allow control mechanism 49, according to readily known techniques and according to predetermined criteria, to determine whether the reactive bank voltage should be raised or lowered in order to effect the proper VAR control with respect to the load 46. Additionally, since electronic VAR correction, i.e. thyristors is not used, the control mechanism 49 can be executed by existing technology already know to one skilled in the art.

It is to be understood that many alternate embodiments of the present invention may be practiced without departing from the spirit and scope of the present invention. For example, appropriately wired inductors may be used in place of capacitors. Further, more than one capacitor or inductor bank may be used. Additionally, the number of increments or steps in the autotransformer may be increased or decreased. Also, more than one system may be placed on-line so as to, in effect, "gang" at least two VAR systems. Further, the load may either be a network grid, an individual piece of equipment or a very specific load (i.e. a building).

Finally, it is to be understood that the present invention is not to be limited to the description herein but only by the claims appended hereto.

What is claimed is:

1. A device for VAR compensation in a power distribution network including a power line, a neutral line and a load connected to the power line and the neutral line to receive power, wherein the voltage and current on the power line are out of phase, the device comprising:

autotransformer means having a primary winding connected between the power line and the neutral line and a secondary winding connected to the power line, said secondary winding producing a plurality of voltages relative to an input voltage of said primary winding at an output terminal of said secondary winding; and at least one reactive bank having a first pole connected to said output terminal and a second pole connected to the neutral line to provide the VAR compensation, wherein the application of each of the plurality of voltages to the reactive bank produces a respectively different phase shift in the voltage on the power line.

2. A device for VAR compensation in a power distribution network including a power line, a neutral line and a load, the device comprising:

an autotransformer having a primary winding connected between the power line and the neutral line and a selectable secondary winding, the primary winding connectable to a load, and the secondary winding configured so as to produce a plurality of voltages, each of which may be individually selectable and producing a secondary output voltage which is relative to the voltage of the primary winding; and at least one reactive bank connectable to the selected secondary output voltage such that the voltage across the reactive bank is that of the secondary output voltage and different than that of voltage of the primary and hence the voltage presented to the load, wherein the application of each of the plurality of voltages to the reactive bank produces a respectively different phase shift in the voltage presented to the load.

3. A device according to claim 2 wherein the reactive bank includes a capacitor bank.

4. A device according to claim 2 wherein the reactive bank includes an inductor bank.

5. A device according to claim 3 wherein the capacitor bank includes a plurality of capacitors connected in parallel.

6. A device according to claim 5 wherein at least one of the plurality of capacitors has, connected in series with it, a switch for selectively energizing the capacitor.

7. A device according to claim 2 wherein the primary winding has a hot terminal connected to the power line and a neutral terminal connected to the neutral line and the secondary winding produces a secondary output voltage which is relative to the voltage of the primary winding at a secondary output terminal thereat when measured between the neutral terminal of the primary winding and the secondary output terminal; and wherein the at least one reactive bank is connected to the secondary output terminal and the neutral terminal.

8. A device according to claim 7 wherein the reactive bank includes a capacitor bank.

9. A device according to claim 8 wherein the capacitor bank includes a plurality of capacitors connected in parallel.

10. A device according to claim 9 wherein at least one of the plurality of capacitors has, connected in series with it, a switch for selectively energizing the capacitor.

11. A device according to claim 10 wherein the power distribution network is a polyphase network and, for each phase of the polyphase network, a respectively different autotransformer and reactive bank are connected between the phase and the neutral line.

12. A device according to claim 10 further comprising a current transformer and an electronic control mechanism connected to the hot terminal for each phase of the load for respectively sensing the current supplied to the load and determining the phase angle thereof, and selecting a secondary output voltage.

13. A device according to claim 2 wherein the power distribution network is a polyphase network and, for each phase of the polyphase network, a respectively different autotransformer and reactive bank are connected between the phase and the neutral line.

14. A device for VAR compensation in a polyphase power distribution network including a plurality of power lines, a load and a neutral line, comprising:

for each phase of the polyphase power distribution network, an autotransformer having a primary winding and a selectable secondary winding, the primary winding of each autotransformer being connected between a respective one of the plurality of power lines and the neutral line, and the secondary winding of each autotransformer being configured so as to produce a plurality of voltages, each of which may be individually selected to produce a respective output voltage which is relative to the voltage of the primary winding; and at least one capacitor bank including a plurality of capacitors connected in parallel, wherein the capacitor bank is connected to the selected secondary output voltage such that the voltage across the capacitor bank is that of the secondary output voltage and different than that of voltage of the primary winding and hence the voltage presented to the load, and wherein at least one of the plurality of capacitors has connected in series with it a switch for selectively energizing the capacitor; and wherein each primary winding has a hot terminal connected to the respective power line and a neutral terminal connected to the neutral line and the secondary winding produces the selected secondary output voltage which is relative to the voltage of the primary winding at a secondary output terminal when measured between the neutral terminal of the primary and the secondary output terminal; and wherein the capacitor bank is connected to the secondary output terminal and the neutral terminal, such that the application of each of the plurality of voltages to the reactive bank produces a respectively different phase shift in the voltage on the power line; and wherein a current transformer and an electronic control mechanism are connected to the hot terminal for each phase for respectively sensing the current supplied to the load and determining the phase angle thereof, to select a secondary output voltage which produces a phase shift in the voltage on the power line that matches the determined phase angle of the current.

15. A device for VAR compensation in a polyphase power distribution network including a plurality of power lines, each corresponding to a respectively different phase of the polyphase power distribution network, a load and a neutral line, the device comprising:

an autotransformer having a plurality of primary windings, each primary winding being coupled at a hot terminal to a respectively different one of the power lines, and a respective plurality of secondary windings, each of the plurality of primary windings being coupled at a neutral terminal to the neutral line having a voltage applied from the respective one of the power lines and being coupled to the load and to the respective secondary winding, each of the secondary windings having a respective selectable output arm for producing one of a plurality of secondary voltages different than the respective primary voltage and based upon the voltage of the primary winding and a position of the output arm;

at least one reactive bank having a plurality of reactive elements connected in parallel, the reactive bank coupled to the output arm of one of the secondary windings and the neutral line such that the secondary voltage is applied across the reactive bank, such that the application of each of the plurality of secondary voltages to the reactive bank produces a respectively different phase shift in the voltage on the power line;

a current transformer coupled to each phase of the polyphase system for sensing current applied to the load from the power lines; and a controller coupled to the current transformer for i) sensing the current supplied to the load and determining the phase angle thereof, and ii) controlling the output arm of the secondary winding to select one of the plurality of secondary output voltages responsive to the determined phase angle;

wherein the secondary winding produces the secondary output voltage which varies in predetermined increments such that voltage transients are less than two times the predetermined voltage increment.

16. A device for VAR compensation according to claim 15, wherein the reactive bank is a capacitive bank.

17. A device for VAR compensation according to claim 15, wherein the reactive bank is an inductive bank.

18. A device for VAR compensation according to claim 15, wherein the reactive bank includes a combination of capacitors and inductors.

19. A device for VAR compensation according to claim 15, wherein the autotransformer further includes a reversing switch to selectively raise or lower the secondary output voltage.

* * * * *